United States Patent [19]  
Johnson

[11] 4,104,434  
[45] Aug. 1, 1978

[54] SIZING COMPOSITION AND GLASS FIBERS SIZED THEREWITH

[75] Inventor: Carl A. Johnson, Granville, Ohio

[73] Assignee: Owens-Corning Fiberglas Corporation, Toledo, Ohio

[21] Appl. No.: 651,754

[22] Filed: Jan. 23, 1976

Related U.S. Application Data

[63] Continuation of Ser. No. 438,041, Jan. 30, 1974, abandoned, which is a continuation of Ser. No. 203,012, Nov. 29, 1971, abandoned.

[51] Int. Cl.$^2$ .................... B32B 17/02; B32B 17/06
[52] U.S. Cl. .................... 428/273; 57/140 G; 57/153; 65/3 C; 260/31.2 R; 260/31.8 M; 427/390 A; 428/378; 428/392
[58] Field of Search .............. 428/378, 391, 392, 273; 260/31.2 R, 31.8 M, 29.2 EP; 65/3 R, 3 C; 57/153, 140 G, 164, 157 R; 427/390 A

[56] References Cited

U.S. PATENT DOCUMENTS

| | | | |
|---|---|---|---|
| 3,336,253 | 8/1967 | Wong | 117/126 GB |
| 3,409,577 | 11/1968 | Wong | 117/126 GB |
| 3,449,281 | 6/1969 | Sullivan | 117/126 GE |
| 3,459,585 | 8/1969 | Killmeyer | 117/126 GE |
| 3,652,326 | 3/1972 | Ward | 117/126 GE |
| 3,729,435 | 4/1973 | Bachmann | 260/18 EP |
| 3,772,870 | 11/1973 | Wong | 117/126 GE |
| 3,810,784 | 5/1974 | Wong | 117/126 GE |

*Primary Examiner*—George F. Lesmes  
*Assistant Examiner*—P. Thibodeau  
*Attorney, Agent, or Firm*—Ronald C. Hudgens; Philip R. Cloutier; Dennis M. Kozak

[57] ABSTRACT

Fibers coated with a size composition comprising a water emulsifiable resin system, an aliphatic monocarboxylic acid and an aliphatic polycarboxylic acid exhibit less size migration when the sized fibers are dried in the form of a forming package.

11 Claims, No Drawings

SIZING COMPOSITION AND GLASS FIBERS SIZED THEREWITH

BACKGROUND OF THE INVENTION

This is a continuation of application Ser. No. 438,041, filed Jan. 30, 1974, which is a continuation of Ser. No. 203,012, filed on Nov. 29, 1971, both now abandoned.

This invention relates to a sizing composition for use on fibrous materials, particularly glass fibers, which sized fibrous materials find particular utility in the field of filament winding.

In the filament winding field, fibrous strands are impregnated with resinous materials and the impregnated strands are advanced to a rotating mandrel to form a filament wound structure. When glass fibers are used to form the fibrous strands, they must first be sized with a protective material in order to withstand the processing operations necessary to form a filament wound structure.

When glass fibers are sized with a protective material substantially immediately after the glass fibers are formed, the sized glass fibers are gathered into a strand and the strand is collected on a forming package. The forming package is normally dried. Upon drying of a forming package, a phenomenon known as migration usually occurs. Migration is the term given to the outward advance of the sizing from the glass fibers in the package when the package is dried. The heat from the ovens causes the moisture from the sizing to be driven outwardly. When this occurs, some of the other sizing ingredients are carried therewith and are deposited on the outer surfaces of the forming package.

The deposit of sizing ingredients on the outer surfaces of the package cause discoloration, which is esthetically unappealing. Furthermore, higher concentrations of the sizing are found on the outside of the package than the inside. This unequal concentration of the sizing on the glass strands that make up a forming package causes non-uniform properties in a reinforced structure, especially filament wound structures. Usually, when glass strands have a higher concentration of sizing thereon, their ability to be wet-out with a subsequently applied resin system is adversely affected.

Heretofore, the migration problem has been lived with, but reluctantly. Normally, the outer wraps of a forming package are stripped therefrom in order to partially solve the problem of uneven sizing concentrations on the glass strands. However, the stripping operation is costly and it also creates a waste problem. Furthermore, stripping only partially solves the problem of trying to obtain glass strands uniformly sized with a protective material. The problem that still persists is discoloration at the ends of a forming package or the turn-around points of the forming package. The turn-around points of a forming package occurs when the advancing strand reaches the end of its path and turns around to advance in the other direction. During the drying of the forming package, the sizing also migrates to the ends of the package; this cannot be corrected by stripping the outer wraps from the package. Discoloration (yellowish-brownish color) is evident on the ends or sides of a package. This discoloration is observed, when the sized strand is unwound from the forming package, at intervals along the length of the strand, wherein the unequal concentrations of the sizing on the strand frequently have been about ten times greater than the nominal concentrations of the sizing on the strand. Also, at the discoloration intervals it is observed that the glass strand has a higher integrity and is stiffer than the other portions of the strand. This higher integrity portion of the strand is more difficult to wet-out thereby causing non-uniform properties in the reinforced structure.

In addition to the problems in the art with sizings for glass fibers, such as migration of the sizing on the package as hereinabove mentioned, there is another problem; the limitation in processing speeds of the sized strand through an impregnant bath prior to filament winding. The processing speed of a sized strand through an impregnant bath is dependent upon numerous factors, including the degree of strand integrity and uniformity of strand integrity per unit length an uniformity of the concentration of the sizing (strand solids) per unit length of the strand. When the strand integrity is too high or it is non-uniform along the length of the strand while going through a stripper die which wipes excess impregnant from the strand, breakage of the fibers within the strand occurs, commonly identified in the art as fuzzing. When the condition intensifies, breakage of the strand occurs. This causes variations in end-product performance and costly delays in processing.

The sizing composition of the invention substantially reduces or prevents the migration of the size from the interior of the forming package to the exterior thereof, as the forming package is dried, particularly in a direct gas-fired oven. Furthermore, the sized glass strands on the forming package possess uniform color, uniform sizing solids per unit length of the strand, and uniform wet-out characteristics with a resin in subsequent processing to produce improved physical properties in filament wound structures. especially cycles-to-weep performance.* The sized glass fibers of this invention further possess the capability of high speed processing through a resinous impregnant bath and stripping dies. The sized glass fibers have reactive sites thereon for further reaction with resinous matrices, particularly with anhydride epoxy impregnants commonly used in filament winding applications.

Cycles-to-weep performances is defined as the amount of time required for an electrolyte, under cycling pressure conditions, to permeate through the wall of a pipe.

SUMMARY OF THE INVENTION

This invention discloses a sizing composition for use on fibrous materials, particularly glass fibers. The sized glass fibers, when dried on a forming package, are substantially free from discoloration and hard spots, thereby possessing the capacity to be uniformly wet-out with a subsequently applied resinous material. More specifically, this invention relates to a sizing for glass fibers, which sized glass fibers are reactable with an anhydride-epoxy resin system, commonly used in filament winding applications.

Glass fibers, after they are sized with a protective material so that they can withstand subsequent processing compositions, are commonly collected on a forming package wherein the advancing glass strand traverses a rotating cylinder mounted on a collet. As the sized glass strand traverses the rotating cylinder to obtain a forming package, it changes direction at the end of each traverse to increase the package build. The locations on the package where the strand changes direction is known in the art as the turn-around points. These turn-around points are usually located at the extreme ends of the package wherein the sized glass strand advances a monitored distance and then turns around and advances in the other direction. When a forming package is dried a phenomenon, known as migration, commonly occurs whereby the sizing seeks its freest energy level upon drying. That is, when the forming package is dried, moisture is given off from the interior of the package to the exterior of the package. By so doing, the water carries other sizing ingredients therewith. Upon reaching the exterior of the forming package, the water evaporates and thereby leaves a deposit of these other ingredients on the outside of the package. In the past, some of this problem could be eliminated by removing the outer-most layers of a forming package prior to advancing the sized glass strand to a resinous impregnant bath in a filament winding operation. However, the problem was only partially solved by so doing because it is at the turn-around points of a forming package, which form the ends or sides of the package, that a large migration of the size usually occurs and this cannot be eliminated by removing the outer layers from the package.

Applicant has found that migration of the size from within the forming package can be substantially reduced or eliminated when the forming package is dried, especially in a direct gas-fired oven by the addition of a volatile aliphatic acid having from 1 to 8 carbon atoms that is water soluble and forms an azeotrope with water and by the addition of a polyfunctional organic acid having from 2 to 9 carbon atoms to a water emulsifiable resin, which resin has a defined relationship with an emulsifiable lubricant. The result is a forming package which is substantially free from discoloration, especially at the turn-around points or ends of the forming package.

Size formulations commonly used in filament winding operations comprise nitrogen-containing film formers. Apparently upon drying, the amino or nitrogen-containing groups react and cause discoloration, especially in a direct gas-fired oven. It is theorized that by using a volatile, water soluble organic acid, preferably formic acid, to emulsify the film former, heat, from the drying of the forming packages, will cause the formic acid to leave or volatilize from the size. The net results is a breaking up of the emulsion. The film former is then insoluble in water and it cannot migrate from the strand. It is further theorized that polyfunctional non-volatile organic acids hasten the breaking up of the emulsion by making the film former an insoluble salt. The polycarboxylic acid is also thought to function as a reducing agent which will in addition prevent discoloration of the nitrogen materials in the size formulations, when the sized glass strands are dried on a forming package. An acid such as lactic acid, however, can be used by itself to emulsify the film former. Apparently it polymerizes as water is removed thereby forming an insoluble salt with the film former in situ on the glass fiber strands.

The sizing composition, in addition to reducing the degree of migration on a forming package and preventing discoloration of the sized strands after drying, provides the necessary abrasion resistance to the glass fibers so that during further processing the glass fibers are not damaged. The sizing composition of the invention may be used on conventional strands which are then dried prior to combining a multiplicity of the strands to form a roving, or the sizing composition may be applied to a roving produced in the forming operation, and then dried.

After the forming package is made, it is dried at approximately 212° to 265° F., and most preferably at about 235° F. for about 24 hours in a conventional gas-fired oven. However, other ovens such as electric or dielectric may be employed.

The dried roving is subjected to an impregnant bath at high speeds of approximately 150 to 500 feet per minute, and most preferably at about 250 feet per minute. The impregnated roving is then passed through stripper dies to wipe excess impregnant, such as anhydride-epoxy resin, from the advancing strand, prior to winding the impregnated strand on a rotating mandrel to form a filament wound structure. The formed structure on the mandrel is then cured in an oven, cooled and removed from the mandrel.

The sized glass fibers of this invention find particular utility in filament winding applications, wherein the glass fibers must be capable of withstanding high speed processing operations, capable of uniform wet-out with a resinous impregnant, and capable of producing an esthetically appealing streak-free filament wound structure.

It is therefore an object of the present invention to provide a sizing composition for glass fibers, which sizing composition subsequent to being applied to glass fibers and subsequent to being collected on a forming package, substantially reduces migration of the sizing from the interior to the exterior of the forming package.

It is another object of the present invention to provide a sizing composition for glass fibers, which sizing, subsequent to being applied to the glass fibers and dried on a forming package, substantially eliminates discoloration of the sized glass fibers.

It is still another object of the present invention to provide a sizing composition for glass fibers, which sizing provides the glass fibers with a capability of being uniformly wet-out with a subsequently applied resinous material.

It is still another object of the present invention to provide sized glass strands possessing uniform strand solids per unit length of strand.

It is yet another object of the present invention to provide sized glass strands possessing uniform strand integrity, wherein the strand integrity is sufficient to withstand subsequent processing but is insufficient to prevent uniform wet-out of the strand with a resinous impregnant.

It is another object of the present invention to provide sized glass strands possessing capabilities of high speed processing through a resinous impregnant bath comprising wiping dies.

It is still a further object of the present invention to provide sized glass fibers which are reactive with a subsequently applied resinous impregnant and which impregnated glass fibers do not cause streaking in a filament wound structure.

These and other objects will become apparent to one skilled in the art from the examples that follow.

DESCRIPTION OF THE PREFERRED EMBODIMENTS

EXAMPLE I

| Ingredients | Percent By Weight |
| --- | --- |
| Water emulsifiable resin system | 1.5 – 2.5 |
| Emusifiable lubricant | 1.9 – 3.0 |
| Volatile aliphatic acid, having from 1–8 carbon atoms, soluble in water | 0.06 – 0.40 |
| Organo silane | 0 – 1.2 |
| Polyfunctional organic acid, having from 2–9 carbon atoms, soluble in water | 0.06 – 0.18 |

-continued

| Ingredients | Percent By Weight |
|---|---|
| Deionized water | balance |

The film formers that may be employed in the sizes within the concepts of this invention comprise amino or polyamino functionality, and are emulsifiable in a slightly acidic solution, preferably formic acid. The film former may be represented by, but is not limited to the following formulae:

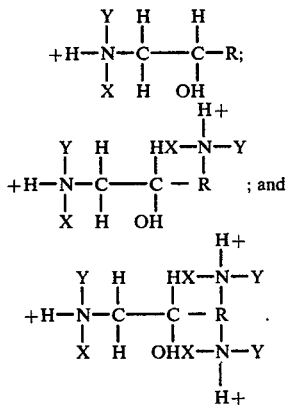

wherein Y is a member of the class consisting of hydrogen, and alkyl radical of a chain length of from 1 to 7 carbon atoms, and an X radical; and X is a member of the groups consisting of: (1) an aliphatic hydrocarbon having a chain length of from 1 to 7 carbon atoms and including at least one hydroxy group (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule having a molecular weight up to approximately 10,000.

The preferred film former is an epoxy resin having at least one of the above solubilizing groups

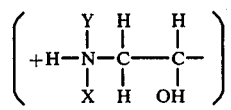

thereon. The solubilizing groups(s) may be present at the ends of the organo molecule or at any position therebetween. However, the film former may be any organo molecule, which includes but is not limited to polyesters, melamines, and polyethyleneimines.

Specific embodiments of the film formers in addition to the other constituents of the sizings of this invention are given in Examples II - XIII.

Example II

| Ingredients | Percent By Weight |
|---|---|
| $CH_3-\overset{O}{\underset{\|}{C}}-O-CH_2-\overset{OH}{\underset{\|}{CH}}-CH_2-\left[O-\text{⌬}-\overset{CH_3}{\underset{CH_3}{\overset{\|}{C}}}-\text{⌬}-O-CH_2-\overset{OH}{\underset{\|}{CH}}-CH_2-\right]_3$ $-O-\text{⌬}-\overset{CH_3}{\underset{CH_3}{\overset{\|}{C}}}-\text{⌬}-O-CH_2-\overset{OH}{\underset{\|}{CH}}-CH_2-\overset{CH_2-CH_2-OH}{\underset{CH_2-CH_2-OH}{N}}$ | 2.0 |
| Polyethylene glycol lubricant | 2.5 |
| Formic acid | 0.12 |
| Gamma-glycidoxypropyltrimethoxy silane | 0.66 |
| Citric acid | 0.12 |
| Deionized water | 94.60 |

The above example demonstrates the employment of a formic acid, which is an aliphatic monocarboxylic acid, and citric acid, which is an aliphatic polycarboxylic acid.

Example III

| Ingredients | Percent By Weight |
|---|---|
| $CH_3-\overset{O}{\underset{\|}{C}}-O-CH_2-\overset{OH}{\underset{\|}{CH}}-CH_2-\left[O-\text{⌬}-\overset{CH_3}{\underset{CH_3}{\overset{\|}{C}}}-\text{⌬}-O-CH_2-\overset{OH}{\underset{\|}{CH}}-CH_2-\right]_3$ $-O-\text{⌬}-\overset{CH_3}{\underset{CH_3}{\overset{\|}{C}}}-\text{⌬}-O-CH_2-\overset{OH}{\underset{\|}{CH}}-CH_2-\overset{CH_2-CH_2-OH}{\underset{CH_2-CH_2-OH}{N}}$ | 1.68 |
| Polyethylene glycol lubricant | 2.10 |
| Formic acid | 0.11 |
| Gamma-glycidoxypriopyltrimethoxy silane | 0.66 |
| Citric acid | 0.14 |
| Deionized water | 95.31 |

Example IV

| Ingredients | Percent By Weight |
|---|---|
| 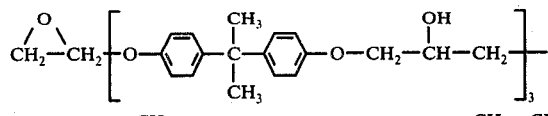 | 2.0 |
| Polyethylene glycol lubricant | 2.5 |
| Formic acid | 0.06 |
| Gamma-glycidoxypropyltrimethoxy silane | 0.66 |
| Citric acid | 0.06 |
| Deionized water | 94.72 |

Example V

| Ingredients | Percent By Weight |
|---|---|
| 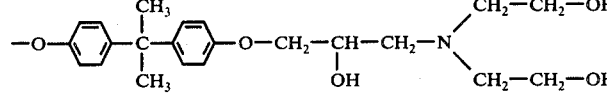 | 1.5 |
| Polyethylene glycol lubricant | 1.9 |
| Formic acid | 0.11 |
| Gamma-glycidoxyproplytrimethoxy silane | 0.4 |
| Gamma-aminopropyltrimethoxy silane | 0.4 |
| Citric acid | 0.13 |
| Dionized water | 95.56 |

Example VI

| Ingredients | Percent By Weight |
|---|---|
| 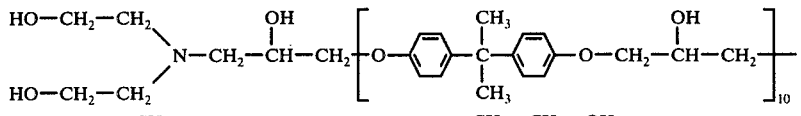 | 1.5 |
| Polyethylene glycol lubricant | 1.9 |
| Formic acid | 0.11 |
| Gamma-aminopropyltrimethoxy silane | 1.2 |
| Citric acid | 0.18 |
| Dionized water | 95.11 |

Example VII

| Ingredients | Percent By Weight |
|---|---|
| 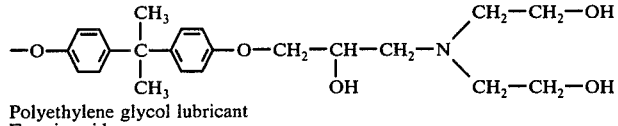 | 2.0 |
| Polyethylene glycol lubricant | 2.5 |
| Formic acid | 0.06 |
| Gamma-glycidoxypropyltrimethoxy silane | 0.66 |
| Citric acid | 0.06 |
| Deionized water | 94.72 |

Example VIII

| Ingredients | Percent By Weight |
|---|---|
| 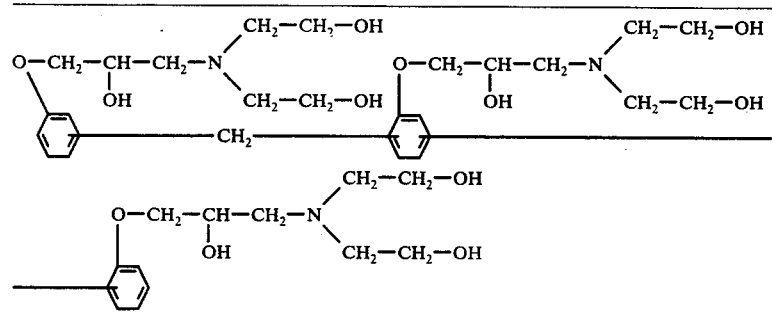 | 2.5 |
| Polyethylene glycol lubricant | 1.9 |
| Formic acid | 0.18 |
| Gamma-glycidoxypropyltrimethoxy silane | 0.8 |
| Citric acid | 0.12 |
| Deionized water | 94.50 |

In the above example the lubricant was reached with the resinous material to obtain the film former.

Example IX

| Ingredients | Percent By Weight |
|---|---|
| 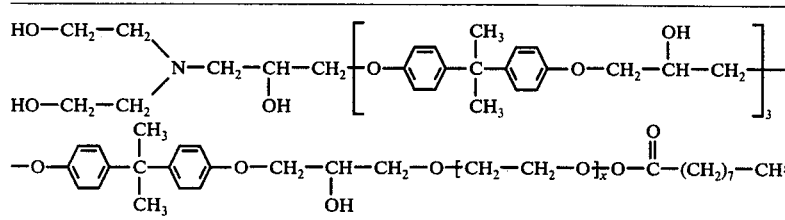 wherein X = 8–10 | 4.5 |
| Formic acid | 0.15 |
| Gamma-glycidoxypropyltrimethoxy silane | 0.9 |
| Citric acid | 0.12 |
| Deionized water | 94.33 |

Example X

| Ingredients | Percent By Weight |
|---|---|
| 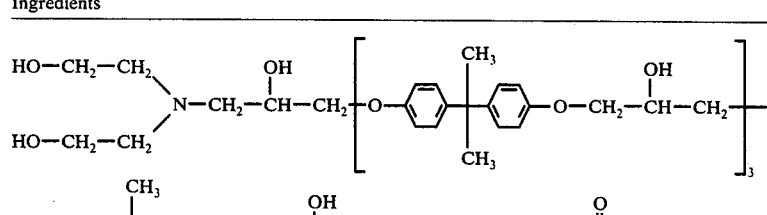 wherein X = 28–36 | 2.0 |
| Polyethylene glycol lubricant | 2.5 |
| Formic acid | 0.08 |
| Gamma-glycidoxypropyltrimethoxy silane | 0.66 |
| Itaconic acid | 0.12 |
| Deionized water | 94.64 |

Example XI

| Ingredients | Percent By Weight |
|---|---|
| 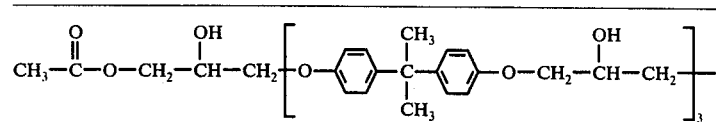 | |

-continued

| Ingredients | Percent By Weight |
|---|---|
| 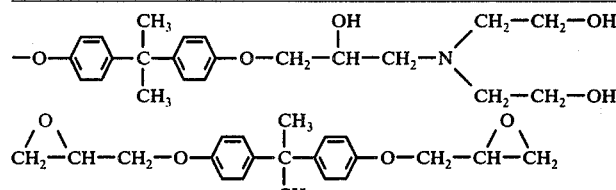 | 0.42 |
| 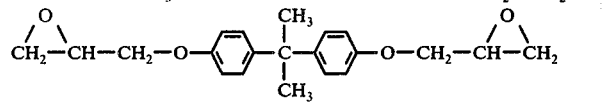 | 1.95 |
| Polyethylene glycol lubricant | 0.80 |
| Formic acid | 0.06 |
| Gamma-glycidoxypropyltrimethoxy silane | 0.83 |
| Citric acid | 0.06 |
| Deionized water | balance |

Example XII

| Ingredients | Percent By Weight |
|---|---|
| 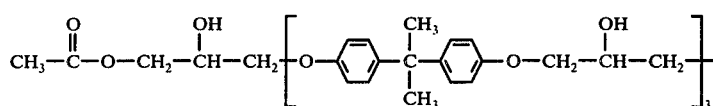 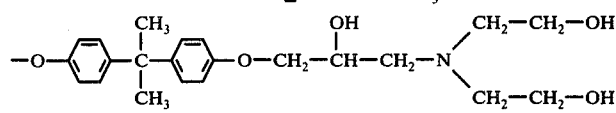 | 2.00 |
| Polyethylene glycol lubricant | 2.50 |
| Propionic acid | 0.40 |
| Gamma-glycidoxypropyltrimethoxy silane | 0.80 |
| Citric acid | 0.10 |
| Deionized water | balance |

Example XIII

| Ingredients | Percent By Weight |
|---|---|
| 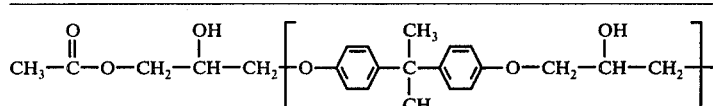 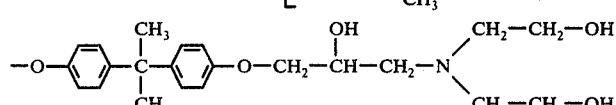 | 2.0 |
| Polyethylene glycol lubricant | 2.5 |
| Lactic acid | 0.3 |
| Gamma-glycidoxypropyltrimethoxy silane | 0.6 |
| Deionized water | balance |

Example XIV

| Ingredient | Percent By Weight |
|---|---|
| 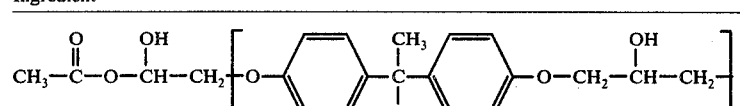 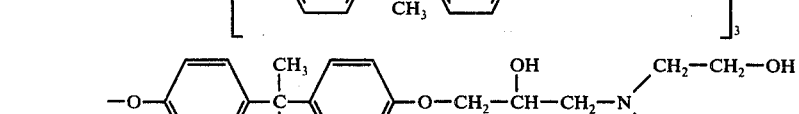 | 2.00 |
| Polyethylene glycol lubricant | 2.50 |
| Gamma-glycidoxypropyltrimethoxy silane | 0.66 |
| Citric acid | 0.40 |
| Dionized water | balance |

Example XV

| Ingredient | Percent By Weight |
|---|---|
| $CH_3-\overset{O}{\underset{\|}{C}}-O-CH-\overset{OH}{\underset{\|}{CH}}-CH_2\left[O-\underset{\underset{CH_3}{\|}}{\overset{\overset{CH_3}{\|}}{C}}\left\langle\bigcirc\right\rangle-O-CH_2-\overset{OH}{\underset{\|}{CH}}-CH_2-\right]_3$ $-O-\left\langle\bigcirc\right\rangle-\underset{\underset{CH_3}{\|}}{\overset{\overset{CH_3}{\|}}{C}}-\left\langle\bigcirc\right\rangle-O-CH_2-\overset{OH}{\underset{\|}{CH}}-CH_2-N\overset{CH_2-CH_2-OH}{\underset{CH_2-CH_2-OH}{\diagdown}}$ | 2.0 |
| Polyethylene glycol lubricant | 2.5 |
| Formic acid | 0.12 |
| Citric acid | 0.12 |
| Dionized water | balance |

The mixing procedure is not of a critical nature, but preferably it comprises forming separate premixes and then combining the premixes in a main mixing vessel. Premix I comprises combining the silane with sufficient water with agitation, to maintain the concentration below 5 percent by weight. The agitation is continued until the silane is completely hydrolyzed and a clear solution is obtained; about 15 to 30 minutes is required. Subsequently, the water emulsifiable resin is added to the main mixing tank and agitated slowly. The lubricant is then added to the resin, followed by the addition of the aliphatic acid thereto, with agitation to solubilize the resin and the lubricant. Deionized water is then added to the contents of the main mixing tank in small amounts with thorough agitation. The small amounts of water will cause the mixture to thicken slightly until an inversion point occurs; this should be approached slowly. After inversion, approximately ⅓ of the water requirement should be added thereto. Premix II comprises combining the polyfunctional organic acid with approximately one gallon of water. Premix II is then added to the main mixing tank with agitation, followed by the addition of Premix I to the mixing tank. Additional deionized water is added to the main mixing tank with agitation sufficient to obtain a mix solids of from 3.0 to 8.0 percent by weight, and preferably from about 4.0 to 6.0 percent by weight.

The sizing compositions of Examples II-XV were applied to advancing glass filaments substantially immediately after the glass filaments were formed. The glass filaments were formed by mechanically attenuating molten streams of glass emitting from a bushing, which bushing controllably holds and emits molten glass. The sized glass filaments were then gathered into a strand, collected onto a rotating cylinder to form a package, and the package was dried in a conventional gas-fired oven. The packages, formed from glass strands coated with the above sizing compositions, were uniformly white in color, and the sized strands possessed excellent processing characteristics, uniform strand solids and uniform wet-out properties with a subsequently applied resinous impregnant.

The amount of sizing that remains on the glass fibers after the forming package is dried ranges from about 0.2 to about 1.0 percent by weight. The preferred amount, determined by the loss on ignition, ranges from about 0.4 to 0.6 percent by weight. The preferred loss on ignition of the sized glass strand is 0.5 percent by weight.

When reinforcing anhydride-epoxy resin laminates, it is desirable that the film former in the sizing for the reinforcement contain primary and secondary hydroxyl reactive groups, which are capable of reacting with the reinforcement and the resin impregnant system, when the laminates are cured.

To achieve the desired amount of strand integrity, a lubricant is added to the sizing, which helps keep the strands integral but yet capable of separation for subsequent wet-out with the resinous impregnant, without adversely affecting the reactive cites provided by the film former.

The volatile aliphatic acid, having from 1 to 8 carbon atoms and which is soluble in water, forms an azeotrope with water. The azeotrope has a boiling point range of approximately 90° to 110° C. and most preferably about 99° C. Formic acid is preferred. The acid is employed in the sizing composition to emulsify the film former. However, when the forming package is drying, the aliphatic acid disassociates from the film former and is distilled from the size composition on the glass strands. This disassociation causes in situ insolubilizaition of the film former on the glass fiber strands on the forming package. This insolubilization of the film former, it is thought, prevents the migration of the film former to the exterior of the forming package, because the insolubilized film former preferentially adheres to the glass fibers during drying.

The organo functional silane is employed in the sizing composition to function as a coupling agent. The silane possess functionality which is reactable with the film former employed in the sizing and reactable with the functionality of the resin impregnant system.

The polyfunctional organic acid, having from 2 to 9 carbon atoms, and which is soluble in water, such as citric acid, is added to the sizing composition so that when the sizing is dried on the glass fiber strands and the formic acid is driven off, the citric acid forms an amine salt which is insoluble in water thereby assisting in preventing migration of the film former to the exterior of the forming package.

The retardation of the migration of the film former to the exterior of the package is thought to be the most important factor in reducing or eliminating migration. This is because the film former adversely binds the glass fibers together, thereby producing unwanted non-uniform strand integrity. When a solid resinous film former, such as a solid epoxy resin is employed, rather than a liquid epoxy resin, the former is tougher and more abrasion resistant than the latter and when migration occurs the problem of non-uniform strand integrity is compounded.

The critic acid, by forming the amine salt and because it can function as a reducing agent, also contributes resistance to oxidtion when the sizing is dried on the forming package. This oxidation is a source of discoloration of the sized strand. Without citric acid, discoloration occurs which is esthetically unappealing.

The ratio of film former/lubricant is important to the sized strand, which is further processed, in order to control the degree of strand integrity at various processing locations. For example, it is desirable to maintain strand integrity unitl the strand is introduced into the impregnant bath. However, the strand integrity must not be too great as it is desirable to separate the glass fibers that constitute the strand, in order to ensure uniform wet-out with the resinous impregnant. The ratio of film former/lubricant preferably ranges from about 1:2 to 2:1 in order to obtain maximum processing performance.

The ranges for the constituents of the sizings of this invention were selected on the basis of a number of factors, including, but not limited to, the desired amount of sizing on the strand, the desired processing characteristics of the sized strands, and the esthetics of the sized strands. For example, if the water emulsifiable resin system is under or above the amount stated, the desired strand solids are too low or too high respectively. The ratio of film former to lubricant must be maintained within limits because if it is too low the sized strand possesses poor runability or run-out properties from the forming package, whereas if it is too high the strand possesses undesirable stiffness and possesses poor wet-out characteristics with a subsequently applied resinous impregnant or matrix resin. The aliphatic acid must be at least within the lower limit in order to emulsify the resinous film former; above the higher limit there is no apparent advantage. Furthermore, the desired pH of the sizing ranges between 4 and 5 in order to maintain the stability of the silane. The limits of the silane are based upon the desired cycles-to-weep performance in the reinforced structure, although there is acceptable cycles-to-weep performance without any silane in the sizing of this invention. The polyfunctional organic acid above the limit causes instability in the emulsion and below the limit, its effectiveness as a reducing agent is lost. The amount of deionized water is based upon the desired solids of the sizing composition.

One of the water emulsifiable resinious materials or film formers which is preferably used, is that which is designated as "ME 10," commerically available from Owens-Corning Fiberglas Corporation. ME-10 comprises the reaction product of a glycidyl ether bisphenol-A type epoxy resin with diethanolamine. Another preferred film former for the sizing of this invention comprises the reaction product of ME-10 and an aliphatic acid. This reaction product can be designated as a bis-phenol-A polyether type resin, which is commercially available from Owens-Corning Fiberglas Corporation under the trade designation "F-10". The amounts used to form this reaction product are such that the remaining epoxy groups from ME-10 are reacted with an aliphatic acid to form an ester having no epoxy functionality. Other epoxy resins that have performed well in the sizing of this invention include "MME-1A" and "MME-3A," commerically available from Owens-Corning Fiberglas Corporation.

The emulsifiable lubricants are preferably polyethylene glycol fatty acid esters, such as "Pegosperse-09" and "Pegosperse 1500 MS," commercially available from Glyco Inc., "Trylube 400 MO," commercially available from Trylon Chemicals, "Trylube PEG 400 Monostearate," commercially available from Trylon Chemicals, and "Trylube PEG 400 Monoisostearate," commercially available from Trylon Chemicals. The molecular weight of the polyethylene glycol fatty acid esters should be about 400. As the molecular weight is decreased, clarity of the filament-wound structure is adversely affected, whereas when the molecular weight is increased to about 1500, good clarity is obtained but lubricity is adversely affected. Other lubricants that have demonstrated their capability within the concepts of this invention include silicone emulsions such as "DC-231", commercially available from Dow Corning Corporation and polyethylene emulsions such as "AC Copolymer 580," commerically available from Allied Chemical Corporation. Blends of the above lubricants have also been used to aid processing characteristics of the sized glass strand.

The volatile aliphatic acid, which is soluble in water, is preferably formic acid because it is a stronger acid and can be used in lower concentrations. However, propionic acid has also demonstrated its capability to function in the intended manner described in the concepts of this invention. Any water soluble aliphatic acid that forms an azeotrope with water that boils at or below 100° C. can be used, Therefore acids, such as butyric acid, valeric acid and ethylhexanoic acid, can be used but their concentration must be increased.

The organo silane preferably has epoxy functionally in order to obtain the best color performance in the filament wound structure. However, amine functionality is acceptable when color is not extremely critical. The organo functional silane that has been found to yield the best color performance is gamma-glycidoxypropyltrimethoxy silane, commerically available under the trade designation "A-187" and "Z-6040," commerically available from Union Carbide Corporation and Dow Corning Corporation respectively. Another organo functional silane that has demonstrated good processing and end-product performance within the concepts of this invention is beta-3,4epoxy cyclohexylethyltrimethoxy silane, commercially available under the trade designation "A-186" from Union Carbide Corporation.

Other organo functional silanes include gamma-aminopropyltrimethoxy silane, commerically available under the trade designation "A-1100" from Union Carbide Corporation, N-beta (aminoethyl) gamma-aminopropyltrimethoxy silane, commercially available under the trade designations "A-1120" and "Z-6020", from Union Carbide Corporation and Dow Corning Corporation respectively and "Z-6026", commercially available from Dow Corporation. Blends of the above identified silanes have also been demonstrated to improve cycles-to-weep performance in a filament-wound structure. These blends include a 50/50 mixture of A-187/Z-6020, A-187/A-1100, A-187/Z-6026, A-186/Z-6020, A-186/A-1100 and A-186/Z-6026.

The polyfunctional organic acid is preferably citric acid. However, other polyfunctional organic acids that have performed well include oxalic acid, itaconic acid, succinic acid, and azelaic acid.

The nominal strand solids of the sizing per unit length preferably is 0.5 percent by weight based on the total weight of the sized glass strand. This preferred strand solids yield optimum cycles-to-weep performance, processability characteristics, and clarity in the formed structure.

The use of formic acid with the water emulsifiable resinous film former and lubricant significantly reduces or eliminates discoloration of forming packages when dried in direct gas-fired ovens. The sizing of this invention also reduces the migration index in a forming package. Variation of the pH of the sizing controls the amount of resin that migrates to the exterior of the package as well as preventing discoloration of the forming package due to reactive gases within the oven environment and possibly due also the oxidation. Generally, as the pH of the sizing is decreased, the migration index of the sizing on a forming package increases, whereas when the pH of the sizing approaches neutrality, the migration index decreases because of smaller particle size in the former and larger particle size in the latter. The environment of direct gas-fired ovens comprises reactive gases, such as $SO_2$ and $NO_2$, which react with the exterior of the forming packages during drying. The net result is an intense yellow color on the exterior of the package. When discolored strands from the forming package are used to manufacture epoxy filament-wound pipe, colored streaks appear in a filament-wound pipe.

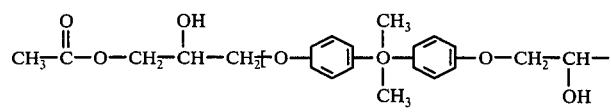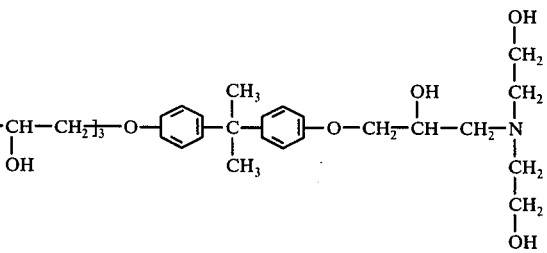

Also, these streaks, attributed to the turn-around points on the forming package, are hard and brittle and wet-out poorly in the resin impregnant bath. The net result is a low quality filament-wound pipe. The same phenomenon applies to other reinforced structures.

When glass fibers are sized with the composition of this invention and compared to glass fibers sized with conventional sizes in reinforcement applications, especially for filament-winding applications, it is readily apparent that the former yields superior products. A good comparison is a polyester compatible sizing wherein the film former is emulsified with a solution of acetic acid. A yellow color results on the dried package. However, when formic acid is used in place of acetic acio in the same sizing, at a pH of from 4 to 5, a much lighter yellow package results. Even better results are obtained when the sizing of this invention is applied to glass fibers and dried; a substantially white package results.

There is some evidence to indicate that the film former does not migrate on drying whereas the lubricant does appear to migrate. Apparently the accumulation of the lubricant on the exterior of the package aids in preventing discoloration of the film former from the sizings of this invention on drying.

There is some evidence also to indicate that the amino groups of the film former react and discolor in a gas-fired oven environment. With this in mind, the concepts of this invention are extendible to protect other amine or nitrogen-containing film formers in glass fiber reinforcement sizes from the combustion reaction products of the direct gas-fired ovens.

I claim:
1. At least one glass fiber coated with a composition comprising a water emulsifiable resin system and an emulsifiable lubricant in a ratio by weight of about 1:2 to about 2:1 respectively, a water-soluble, volatile aliphatic monocarboxylic acid containing from 1 to 8 carbon atoms and an aliphatic polycarboxylic acid containing from 2 to 9 carbon atoms.
2. The glass fiber of claim 1 in which said monocarboxylic acid is selected from the group consisting of acetic acid, formic acid, lactic acid, propionic acid, butyric acid, valeric acid and ethylhexanoic acid.
3. The glass fiber of claim 1 in which said polycarboxylic acid is selected from the group consisting of citric acid, oxalic acid, itaconic acid, succinic acid and azelaic acid.
4. The glass fiber of claim 1 in which said monocarboxylic acid is present in said composition in an amount within a range of from about 0.06 to about 0.40 percent by weight of the total composition.
5. The glass fiber of claim 1 in which said polycarboxylic acid is present in an amount within the range of from about 0.06 to about 0.18 percent by weight.
6. The glass fiber of claim 1 in which said water emulsifiable resin system comprise a composition having the formula in an amount of about 2.0 percent by weight, said monocarboxylic acid is formic acid present in an amount of about 0.12 percent by weight, and said polycarboxylic acid is citric acid present in an amount of about 0.12 percent by weight.
7. The glass fiber of claim 1 in which said glass fiber is in the form of a forming package.
8. At least one glass fiber coated with a composition comprising a water emulsifiable resin system and an emulsifiable lubricant in a ratio by weight of about 1:2 to 2:1 respectively, formic acid and citric acid.
9. Strands comprising a plurality of glass fibers coated with a composition comprising a water emulsifiable resin system and an emulsifiable lubricant in a ratio by weight of between about 1:2 and about 2:1 respectively, a water-soluble, volatile aliphatic monocarboxylic acid containing from 1 to 8 carbon atoms and an aliphatic polycarboxylic acid.
10. Woven fabrics comprising a plurality of glass fibers coated with a composition comprising a water emulsifiable resin system and an emulsifiable lubricant in a ratio by weight of between about 1:2 to about 2:1 respectively, a water-soluble, volatile aliphatic monocarboxylic acid containing from 1 to 8 carbon atoms and an aliphatic polycarboxylic acid.
11. Yarns comprising a plurality of glass fibers coated with a composition comprising a water emulsifiable resins system and an emulsifiable lubricant in a weight ratio of between about 1:2 and about 2:1 respectively, a water-soluble, volatile aliphatic monocarboxylic acid and an aliphatic polycarboxylic acid.

* * * * *